G. G. WESTERFIELD.
CYCLE FLIER.
APPLICATION FILED MAR. 28, 1917.

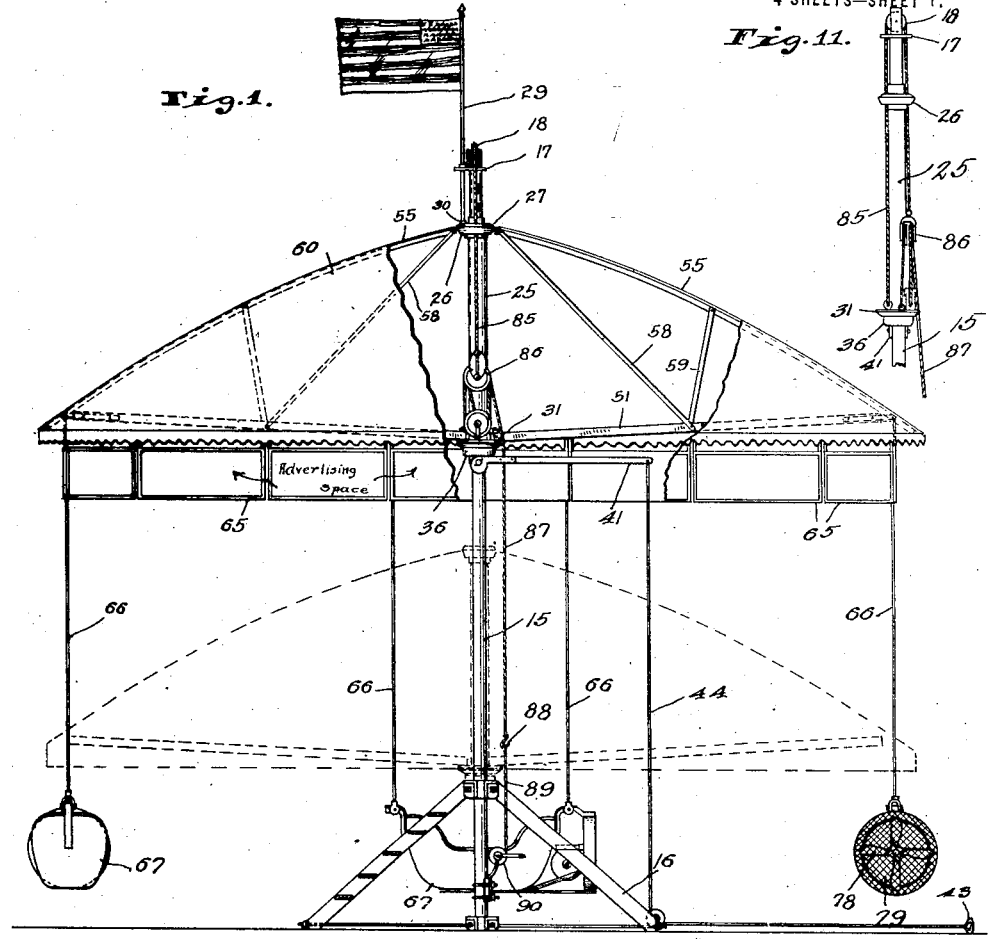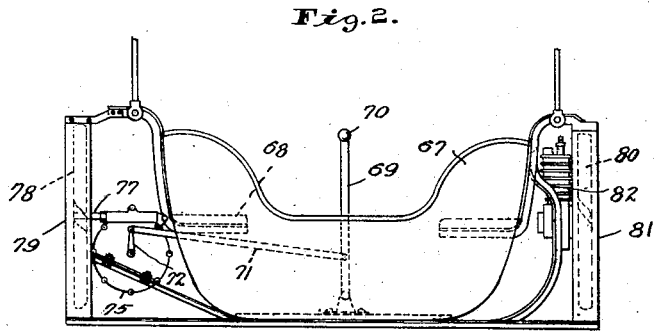

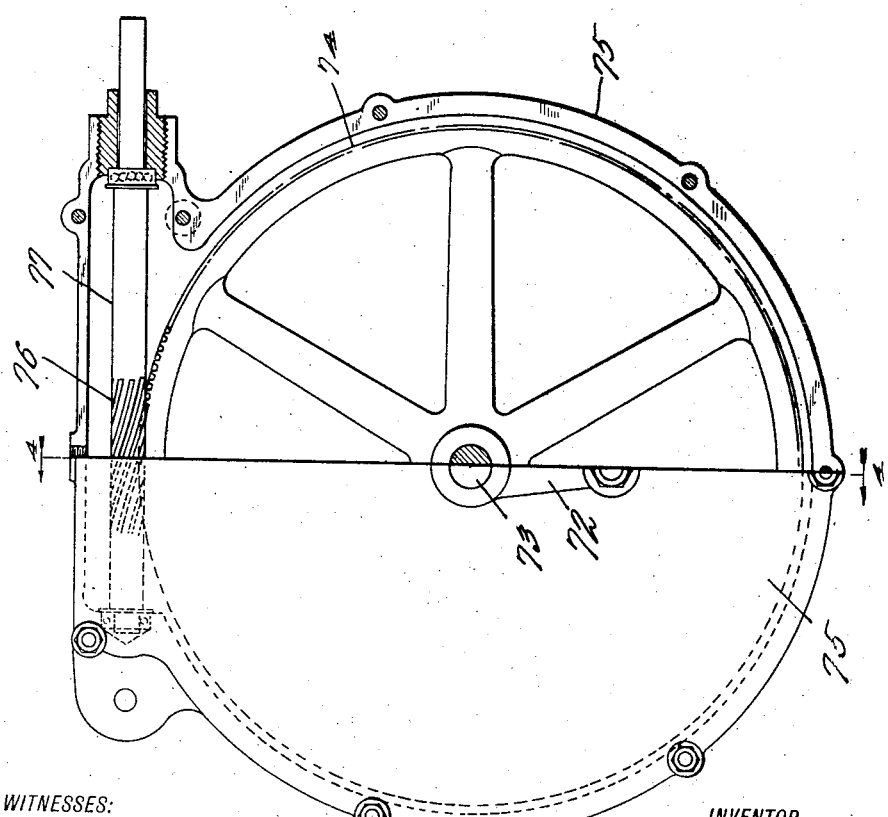

1,269,988.

Patented June 18, 1918.
4 SHEETS—SHEET 3.

WITNESSES:
Frank A. Fahle
Josephine Gasper

INVENTOR
Granville G. Westerfield,
BY
Hood & Schley.
ATTORNEYS

G. G. WESTERFIELD.
CYCLE FLIER.
APPLICATION FILED MAR. 28, 1917.
1,269,988.
Patented June 18, 1918.
4 SHEETS—SHEET 4.
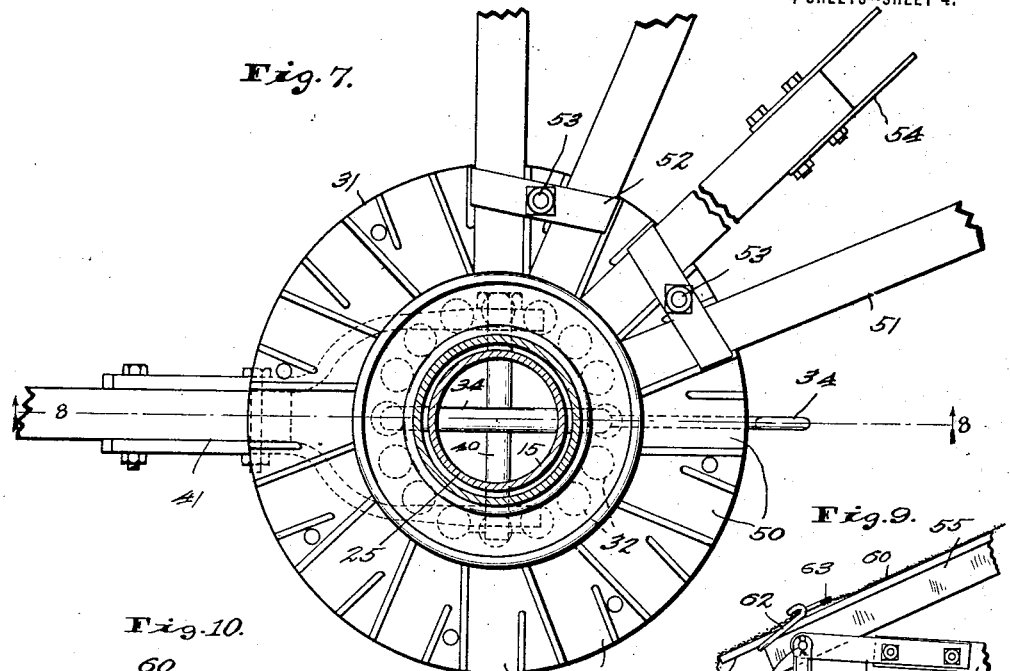
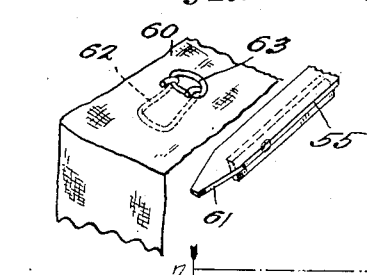
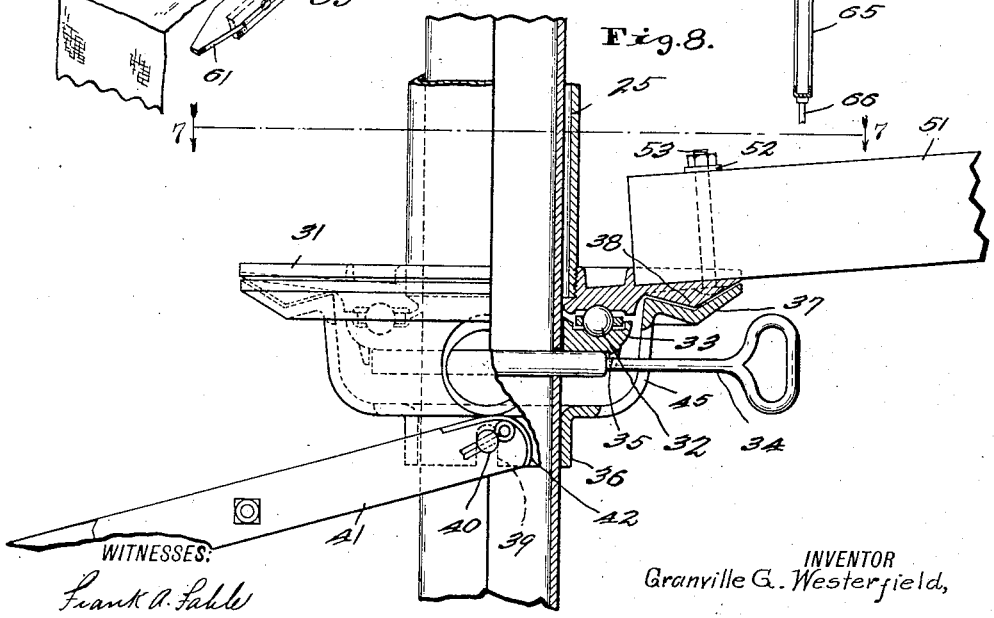
WITNESSES:
INVENTOR
Granville G. Westerfield,
BY
Hood & Schley.
ATTORNEYS

UNITED STATES PATENT OFFICE.

GRANVILLE G. WESTERFIELD, OF DES MOINES, IOWA, ASSIGNOR TO THE CYCLE-FLYER COMPANY, OF DES MOINES, IOWA, A CORPORATION OF IOWA.

CYCLE-FLIER.

1,269,988. Specification of Letters Patent. Patented June 18, 1918.

Application filed March 28, 1917. Serial No. 157,888.

*To all whom it may concern:*

Be it known that I, GRANVILLE G. WESTERFIELD, a citizen of the United States, residing at Des Moines, in the county of Polk and State of Iowa, have invented new and useful Cycle-Fliers, of which the following is a specification.

It is the object of my invention to provide a cycle flier, especially for children's play grounds, which shall be inexpensive to construct, easy to assemble, operable by those who ride, and readily controllable by a supervisor.

Figure 5:
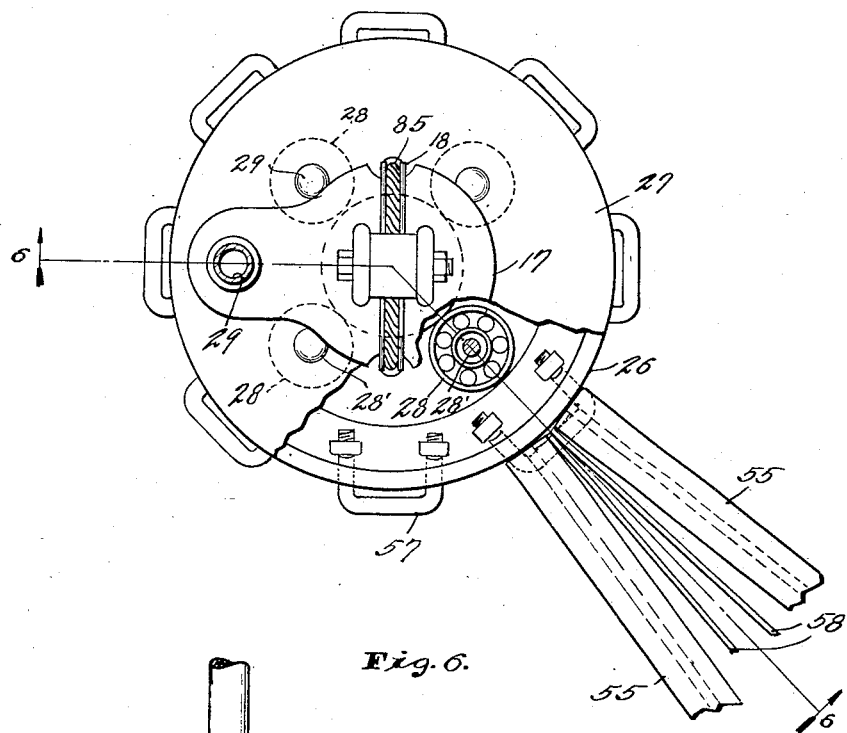
Figure 6:
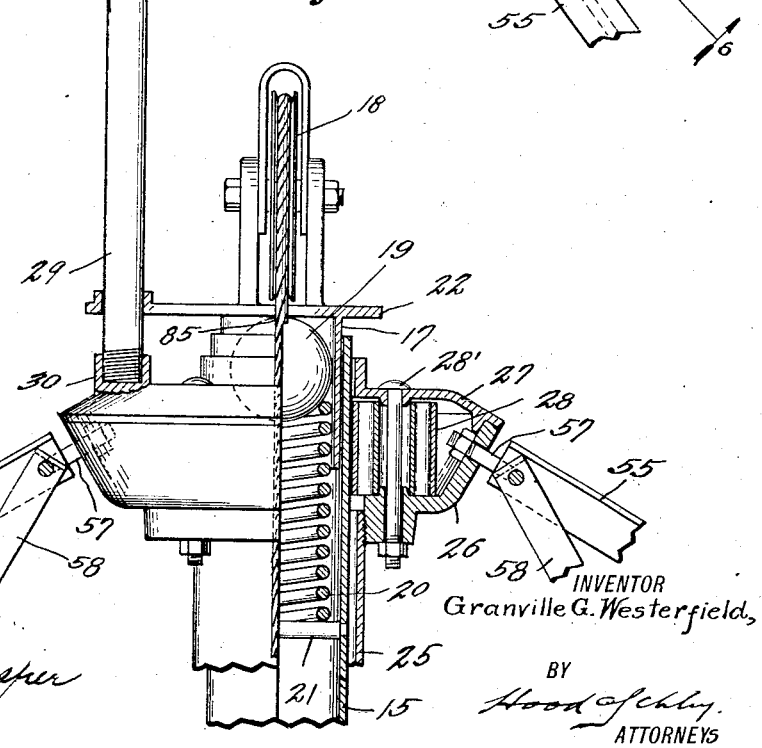

Figure 1 is an elevation, with parts broken away, of a cycle flier embodying my invention; Fig. 2 is an enlarged elevation of one of the cars; Fig. 3 is an elevation in partial section of the spiral gear used in driving the propeller on the car; Fig. 4 is a section on the line 4—4 of Fig. 3; Fig. 5 is an enlarged plan of the central part of the cycle flier, partly broken away, showing the hoisting pulley at the top and the rollers; Fig. 6 is a section on the line 6—6 of Fig. 5; Fig. 7 is a section through the center part of the cycle flier, just above the compression members of the supporting framework, being taken on the line 7—7 of Fig. 8; Fig. 8 is a section on the line 8—8 of Fig. 7; Fig. 9 is a sectional detail of the fastening of the edge of the fabric cover; Fig. 10 is a perspective view of the same detail; and Fig. 11 is a detail showing the connection of the hoisting rope.

The cycle flier has a central, vertical, stationary tubular, supporting post 15, mounted at the bottom in a suitable bracing framework 16, which may also be provided with ladder steps. Loosely telescoping within the top of this tubular post 15 is a cap piece 17 which carries a sheave 18 rotatable in a vertical plane, said cap piece resting on a ball 19 supported on a spring 20 in turn resting on a cross pin 21 within the tubular post 15 near its upper end, so that the spring 20 normally lifts the flange 22 of the cap piece 17 off the upper end of the post 15 so that the cap piece can be rotated with a minimum of friction.

The rotating element has a central tubular member 25 which loosely surrounds the post 15 and may both rotate thereon and be slid longitudinally thereof as hereinafter explained. The upper end of this tubular member 25 is screw-threaded into a casting 26 which coöperates with a cover 27 to provide a casing for a plurality of rollers 28 mounted on pins 28' and acting against the outer surface of the supporting post 15, as clear from Figs. 5 and 6. A rod 29 is screw-threaded into an eccentric socket 30 on the cover 27 and projects upward through the eccentric hole in the cap piece 17, so that such cap piece and parts carried thereby rotate with the roller-casing 26—27. The lower end of this tubular member 25 is screw-threaded into a casting 31 which on its under surface is provided with a ball race for a series of bearing balls 32 which rest on a similar ball race on a normally stationary annulus 33. The annulus 33 is releasably locked to the central supporting post 15 by a removable cross pin 34, which projects through a transverse hole in such post 15 beneath the annulus 33, so that the annulus rests on such pin, and the annulus is provided with depending fingers 35 which project downward on opposite sides of the pin 34 and at opposite ends of the larger central portion of such pin so as to prevent the annulus from turning and the pin from being withdrawn save when the annulus is first lifted slightly. The pin 34 thus carries the weight of the rotating element. By removing the pin 34, the annulus 33 and the whole rotating element may be lowered, as more fully explained hereinafter. A brake member 36 is slidably mounted on the post 15 below the annulus 33 and pin 34, and projects upward around the outside of the annulus 33 into proximity to the casting 31; and the upper surface of the brake member 36 is provided with a circular V-shaped groove 37 and the lower surface of the casting 31 with a circular V-shaped rib 38 mating with the groove 37, as clear from Fig. 8. The groove 37 is normally out of contact with the rib 38, as shown. The barrel of the brake member 36 is provided with a slot 39 for receiving a cross pin 40 passing through the supporting post 15 and preventing the brake member from turning; and on this pin 38 is pivoted a brake lever 41 which has an eccentric surface 42 coöperating with the under face of the brake member 36 near the barrel, so that by pulling down on the outer end of the brake lever 41, as by an operating handle 43 at the end of a rope 44 attached to such outer end and extending over a sheave 46 on the framework 16, the eccentric surface 42 lifts the brake member 36 along the post 15 and first produces engagement of the brake groove 37 with the brake rib 38, and upon further movement lifts the casting 31 and the whole supporting element free from the balls 32 so that the rotating element is carried by the brake surfaces 37—38, the friction between which soon produces stoppage. The brake member 36 is provided with lateral holes 45, for permitting the insertion and removal of the pin 34.

The upper face of the casting 31 is provided with a series of radial grooves 50 in which are mounted the inner ends of compression members 51, conveniently wooden beams, which are clamped to the casting 34 in pairs by cross bars 52, each of which overlaps the two compression members of a pair and is held down by a central bolt 53. At their outer ends, the compression members 51 have bolted thereto metal side plates 54 which project beyond the ends of the compression members 51 and receive between them the lower ends of oblique tension ribs 55, to which they are fastened by pivot pins 56, the upper ends of said tension ribs being attached by U-bolts 57, to the casting 26. The tension ribs 55 are conveniently formed of metal T-bars. Intermediate points on the compression members 51 are connected by tension rods or bars 58 to the U-bolts 57, and from these same intermediate points on the compression members 51 struts 59 project upward to intermediate points on the tension ribs 55 so as to produce an upward bowing of the latter, as clear from Fig. 1. By reason of the tension rods 58 the compression members 51 are prevented from bowing downward under the reaction of the struts 59. The upper ends of the tension rods 58 are perforated to receive the U-bolts 57, and such upper ends are bent outward, to bear against the stems of the pair of T-bars 55 on each U-bolt 57 and space them apart, as clear from Fig. 5. A fabric cover 60, conveniently of canvas, rests on the tension ribs 55 and preferably overhangs the outer ends of such tension ribs slightly to form a valance. At the lower and outer end of each tension rib 55 the cross of the T-bar projects farther than the stem thereof to provide a tongue 61 which receives a U-shaped wire clip 62 the free ends of which are hooked to project through an eyelet 63 provided in a fabric cover 60 near its outer edge, so as to hold such cover upon the ribs 55. The clips 62 are hooked into the eyelets 63 before the struts 59 are put in place, so that when these struts are placed and the tension ribs 55 are bowed, the fabric cover is stretched to make it smooth.

The pins 56 also serve as pivot pins for swinging frames 65 in which may be mounted any desired advertisements. To the lower edges of some of these frames 65 are connected ropes or cables 66 by which are hung passenger-carrying cars 67, each car being supported by a pair of ropes 66. These cars are provided with facing seats 68 in which passengers may sit facing each other, so that an upwardly projecting operating lever 69 pivoted in the bottom of the car and provided with a cross handle 70 is located between them. This operating lever is connected by a pair of links 71 to two cranks 72 fixed on the shaft 73 of a large spiral gear 74 mounted on a casing 75 at the rear of the car 67, said large spiral gear 74 meshing with a much smaller spiral gear 76 on a rearwardly extending shaft 77 also mounted in the casing 75 and provided at its rear end with a multiple bladed propeller 78 located for the sake of safety within a wire cage 79. There may also be a similar propeller 80 within a suitable wire cage 81 at the front of the car 67, said propeller being mounted on or otherwise suitably connected to the driving shaft of any suitable motor, such as an internal combustion engine 82. Either or both propellers 80 or 82 may be used, and either may be omitted.

A rope 85 passes over the sheave 18 and is fixedly connected at one end to the rotating element, conveniently at the lower end thereof as clear from Fig. 11, and at the other is connected to a block and tackle 86 (see Figs. 1 and 11) the rope 87 of which extends downward and is provided with a hook 88 at its lower end by which it may be connected to a loop at the end of a rope 89 on a windlass 90 carried by the post 15 at its lower end. The hook 88 provides means for disconnecting the ropes 87 and 89, so that the rope 87 may be looped up within the framework of the rotating element and the two ropes 85 and 87 and the tackle 86 may rotate with such rotating member without interference from the rope 89 and windlass 90.

In assembling the structure, the central post 15 is set up in its stand 16, and the rotating element is assembled on such post in the position shown in dotted lines in Fig. 1. Then the ropes 87 and 89 are connected by the hook 88, and the windlass 90 is operated. This first pulls down the cap piece 17 so that the flange 22 thereof rests on the upper end of the post 15. It then raises the rotating element from the dotted-line position to the full-line position (Fig. 1). When the full-line position is reached, the brake member 36 and annulus 33 are moved up together into the proper working position, the pin 34 is inserted through one of the holes 45 to provide a support for the annulus 32, and the pin 40 is inserted through the brake lever 41 and the slot 39 to furnish a support for such brake lever 41 and brake member 36. Then the windlass 90 is eased off to let the weight of the rotating element come on the annulus 33, the cap piece 17 at the same time being raised by the spring 20 to separate the flange 22 from the top of the post 15. The hook 88 is now disconnected and the rope 80 looped up in the framework in the rotating element.

The device is now ready for operation. If it is to be operated by power, the engines 82 in the cars are started into operation, and with passengers in the cars the whole rotating element rotates about the central post 15, the cars swinging out somewhat by centrifugal force. If the device is operated by hand, the passengers in the car move the operating levers 69 back and forth, thus rotating the propellers 78, and producing the same movement of the rotating element. The cap piece 17 rotates with the rotating element, with a minimum of friction because it rests wholly on the ball 19. The supervisor (or ticket seller) who is controlling the operation may be either without or within the circle traveled by the cars 67, and can stop the rotation at any time by pulling on the ropes 44, thus raising the brake member 36 and lifting the rotating element off its ball bearings by the engagement of the brake groove 37 and brake rib 38 between which there is sufficient friction to produce a quick stopping without jerking.

I claim as my invention:

1. In a cycle flier, the combination of a central supporting post, a rotating element mounted to rotate thereon, a cap piece mounted on the upper end of said post, said cap piece having a flange for engagement with the end of the post, a spring within the end of the post tending to lift said cap piece to disengage said flange from the post end, and a ball between the spring end and said cap piece, said cap piece being connected to said rotating element so as to rotate therewith, and means associated with said cap piece and said rotating element for lifting the latter.

2. In a cycle flier, the combination of a central supporting post, a rotating element mounted to rotate thereon, a cap piece mounted on the upper end of said post, said cap piece being connected to said rotating element so as to rotate therewith, and means associated with said cap piece and said rotating element for lifting the latter.

3. In a cycle flier, the combination of a central supporting post, a rotating element mounted to rotate thereon, a cap piece mounted on the upper end of said post, said cap piece having a flange for engagement with the end of the post, a spring within the end of the post tending to lift said cap piece to disengage said flange from the post end, said cap piece being connected to said rotating element so as to rotate therewith, and means associated with said cap piece and said rotating element for lifting the latter.

4. In a cycle flier, the combination of a central supporting post, a rotating element mounted to rotate thereon, a cap piece mounted on the upper end of said post, said cap piece having a flange for engagement with the end of the post, a spring within the end of the post tending to lift said cap piece to disengage said flange from the post end, a ball between the spring end and said cap piece, said cap piece being connected to said rotating element so as to rotate therewith, a sheave carried by said cap piece, a rope passing over said sheave, a windlass on the lower part of said post, and a releasable connection between said rope and said windlass.

5. In a cycle flier, the combination of a central supporting post, a rotating element mounted to rotate thereon, a cap piece mounted on the upper end of said post, said cap piece being connected to said rotating element so as to rotate therewith, a sheave carried by said cap piece, a rope passing over said sheave, a windlass on the lower part of said post, and a releasable connection between said rope and said windlass.

6. In a cycle flier, the combination of a central supporting post, a rotating element mounted to rotate thereon, a cap piece mounted on the upper end of said post, said cap piece having a flange for engagement with the end of the post, a spring within the end of the post tending to lift said cap piece to disengage said flange from the post end, said cap piece being connected to said rotating element so as to rotate therewith, a sheave carried by said cap piece, a rope passing over said sheave, a windlass on the lower part of said post, and a releasable connection between said rope and said windlass.

7. In a cycle flier, the combination of a central supporting post, a rotating element mounted to rotate thereon, a cap piece mounted on the upper end of said post, said cap piece being connected to said rotating element so as to rotate therewith, means associated with said cap piece and said rotating element for lifting the latter, a bearing surrounding said central post and on which said rotatable element rests, and removable means for supporting said bearing at the desired height on said post, so that by the removal of such means the bearing may be dropped.

8. In a cycle flier, the combination of a central supporting post, a rotating element mounted to rotate thereon, a cap piece mounted on the upper end of said post, said cap piece being connected to said rotating element so as to rotate therewith, a sheave carried by said cap piece, a rope passing over said sheave, a windlass on the lower part of said post, and a releasable connection between said rope and said windlass, a bearing surrounding said central post and on which said rotatable element rests, and removable means for supporting said bearing at the desired height on said post, so that by the removal of such means the bearing may be dropped.

9. In a cycle flier, the combination of a central supporting post, a rotating element mounted to rotate thereon, a bearing supporting said rotating element from said post, and a brake member vertically movable on said supporting post, said brake member and rotating element having coöperating brake surfaces which are normally disengaged but may be engaged upon such vertical movement upward, said brake member surrounding said bearing and being disposed with relation to said post so that it produces a balanced action around the post.

10. In a cycle flier, the combination of a central supporting post, a rotating element mounted to rotate thereon, a bearing supporting said rotating element from said post, and a brake member vertically movable on said supporting post, said brake member and rotating element having coöperating brake surfaces which are normally disengaged but may be engaged upon such vertical movement upward and which when so engaged lift the rotating element from said bearing, said brake member being disposed with relation to said post so that it produces a balanced action around the post.

11. In a cycle flier, the combination of a central supporting post, a rotating element mounted to rotate thereon, a bearing supporting said rotating element from said post, and a brake member vertically movable on said supporting post, said brake member and rotating element having coöperating brake surfaces which are normally disengaged but may be engaged upon such vertical movement upward, said brake member being so inter-related with said rotating element and said bearing that when it is lifted to produce engagement of said braking surfaces it also lifts said rotating element off said bearing.

12. In a cycle flier, the combination of a central supporting post, a rotating element mounted to rotate thereon, a bearing supporting said rotating element from said post, and a brake member vertically movable on said supporting post, said brake member and rotating element having coöperating brake surfaces which are normally disengaged but may be engaged upon such vertical movement upward, said brake member surrounding said bearing and being so inter-related with said rotating element and said bearing that when it is lifted to produce engagement of said braking surfaces it also lifts said rotating element off said bearing.

13. In a cycle flier, the combination of a central supporting post, and a rotating element rotatably mounted on said post, said rotating element comprising a central tubular member surrounding said central supporting post, a plurality of compression members radiating from a lower point on said tubular member, a plurality of tension members radiating from a higher point on said tubular member, said tension members being oblique and meeting and being connected with said compression members at their outer ends, a fabric covering resting on said tension members and hooked thereto near the outer ends of the latter, and struts connecting intermediate points on said tension and compression members and bowing the tension members upward to stretch said fabric cover, and a plurality of cars hung from the outer ends of said tension members.

14. In a cycle flier, the combination of a central supporting post, and a rotating element rotatably mounted on said post, said rotating element comprising a central tubular member surrounding said central supporting post, a plurality of compression members radiating from a lower point on said tubular member, a plurality of tension members radiating from a higher point on said tubular member, said tension members being oblique and meeting and being connected with said compression members at their outer ends, a fabric covering resting on said tension members and hooked thereto near the outer ends of the latter, struts connecting intermediate points on said tension and compression members and bowing the tension members upward to stretch said fabric cover, and additional tension members connecting intermediate points on said compression members with said tubular member at a point higher than that at which said compression members are connected thereto.

15. In a cycle flier, the combination of a central supporting post, and a rotating element rotatably mounted on said post, said rotating element comprising a central tubular member surrounding said central supporting post, a plurality of compression members radiating from a lower point on said tubular member, a plurality of tension members radiating from a higher point on said tubular member, said tension members being oblique and meeting and being connected with said compression members at their outer ends, a fabric covering resting on said tension members and hooked thereto near the outer ends of the latter, struts connecting intermediate points on said tension and compression members and bowing the tension members upward to stretch said fabric cover, and additional members connecting intermediate points on said compression members with said tubular member to prevent downward bowing of said compression members under the action of said struts.

In witness whereof, I have hereunto set my hand at Des Moines, Iowa, this 24th day of March, A. D. one thousand nine hundred and seventeen.

GRANVILLE G. WESTERFIELD.

Copies of this patent may be obtained for five cents each, by addressing the "Commissioner of Patents, Washington, D. C."